(12) United States Patent
Wu

(10) Patent No.: US 12,101,754 B2
(45) Date of Patent: Sep. 24, 2024

(54) INTERFERENCE PROCESSING METHOD, TERMINAL, AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 367 days.

(21) Appl. No.: 17/562,275

(22) Filed: Dec. 27, 2021

(65) Prior Publication Data

US 2022/0124734 A1 Apr. 21, 2022

Related U.S. Application Data

(63) Continuation of application No. PCT/CN2020/097982, filed on Jun. 24, 2020.

(30) Foreign Application Priority Data

Jul. 4, 2019 (CN) .......................... 201910601041.9

(51) Int. Cl.
*H04W 72/21* (2023.01)
*H04W 72/12* (2023.01)
*H04W 72/542* (2023.01)

(52) U.S. Cl.
CPC ....... *H04W 72/1215* (2013.01); *H04W 72/21* (2023.01); *H04W 72/542* (2023.01)

(58) Field of Classification Search
CPC ......... H04W 72/1215; H04W 72/1284; H04W 72/1231; H04W 72/542; H04W 72/21; H04W 76/15
See application file for complete search history.

(56) References Cited

U.S. PATENT DOCUMENTS

| | | | | |
|---|---|---|---|---|
| 9,992,773 B2 * | 6/2018 | Kim | ....................... | H04W 76/15 |
| 10,149,295 B2 * | 12/2018 | Kim | ....................... | H04L 5/001 |
| 10,681,648 B2 * | 6/2020 | Jeon | ..................... | H04W 52/281 |

(Continued)

FOREIGN PATENT DOCUMENTS

| CN | 102595465 A | 7/2012 |
|---|---|---|
| CN | 103546236 A | 1/2014 |

(Continued)

OTHER PUBLICATIONS

Nokia, "Single UL Transmission in LTE-NR Dual Connectivity", 3GPP TSG-RAN WG1 NR AH #3, R1-1716614, Nagoya, Japan, Sep. 18-21, 2017.

(Continued)

*Primary Examiner* — Hai V Nguyen
(74) *Attorney, Agent, or Firm* — Price Heneveld, LLP

(57) ABSTRACT

An interference processing method, a terminal, and a network-side device are provided. The interference processing method applied to a terminal includes: in a case that inter-modulation interference occurs between frequencies corresponding to different radio access technologies RATs, sending auxiliary information of the inter-modulation interference to a network-side device, where the auxiliary information includes identification information of a first frequency associated with the inter-modulation interference and interference information of the first frequency.

17 Claims, 4 Drawing Sheets

(56) References Cited

U.S. PATENT DOCUMENTS

| | | | |
|---|---|---|---|
| 10,979,982 B2* | 4/2021 | Jeon | H04W 52/146 |
| 11,678,349 B2* | 6/2023 | Kim | H04W 72/51 |
| | | | 370/330 |
| 11,711,770 B2* | 7/2023 | Piipponen | H04L 5/0094 |
| | | | 370/335 |
| 11,888,766 B2* | 1/2024 | Yang | H04W 76/15 |
| 2013/0194938 A1 | 8/2013 | Immonen et al. | |
| 2013/0301468 A1 | 11/2013 | Lee et al. | |
| 2013/0322260 A1 | 12/2013 | Yao et al. | |
| 2014/0050134 A1 | 2/2014 | Ahn et al. | |
| 2015/0245365 A1 | 8/2015 | Isokangas et al. | |
| 2016/0205681 A1* | 7/2016 | Kim | H04W 72/21 |
| | | | 370/329 |
| 2018/0279308 A1* | 9/2018 | Kim | H04L 5/001 |
| 2019/0082337 A1 | 3/2019 | Gheorghiu et al. | |
| 2019/0215781 A1* | 7/2019 | Jeon | H04W 76/32 |
| 2020/0119764 A1 | 4/2020 | Zhou | |
| 2020/0305090 A1* | 9/2020 | Jeon | H04W 24/10 |
| 2020/0350937 A1 | 11/2020 | Hong | |
| 2020/0396740 A1* | 12/2020 | Toeda | H04W 72/541 |
| 2020/0413305 A1* | 12/2020 | Rahman | H04W 56/0045 |
| 2021/0022146 A1 | 1/2021 | Hong | |
| 2021/0029715 A1* | 1/2021 | Takahashi | H04W 76/15 |
| 2021/0068100 A1* | 3/2021 | Takeda | H04W 72/23 |
| 2021/0068103 A1* | 3/2021 | Toeda | H04W 72/27 |
| 2021/0092662 A1 | 3/2021 | Takahashi et al. | |
| 2021/0184806 A1* | 6/2021 | Yang | H04W 74/04 |
| 2021/0235388 A1* | 7/2021 | Jeon | H04W 52/325 |
| 2021/0307011 A1* | 9/2021 | Yang | H04W 72/02 |
| 2022/0046550 A1* | 2/2022 | Jeon | H04W 52/241 |
| 2022/0201654 A1* | 6/2022 | Lee | H04W 72/20 |
| 2022/0394605 A1* | 12/2022 | Wang | H04W 48/18 |

FOREIGN PATENT DOCUMENTS

| | | |
|---|---|---|
| CN | 108401537 A | 8/2018 |
| CN | 108513698 A | 9/2018 |
| CN | 109451825 A | 3/2019 |
| JP | 2014502825 A | 2/2014 |
| JP | 2020513228 A | 5/2020 |
| WO | 2019006736 A1 | 1/2019 |
| WO | 2019031212 A1 | 2/2019 |
| WO | 2019065634 A1 | 4/2019 |

OTHER PUBLICATIONS

Guangdong Oppo Mobile Telecom, "Discussion on the NR-LTE self-interference issue", 3GPP TSG RAN WG1 NR Ad-Hoc#2, R1-1710173, Qingdao, P.R. China Jun. 27-30, 2017.

* cited by examiner

FIG. 1

In a case that inter-modulation interference occurs between frequencies corresponding to different radio access technologies RATs, send auxiliary information of the inter-modulation interference to a network-side device, where the auxiliary information includes identification information of a first frequency associated with the inter-modulation interference and interference information of the first frequency — 201

FIG. 2

Receive, from a terminal, auxiliary information of inter-modulation interference occurred between frequencies corresponding to different RATs, where the auxiliary information includes identification information of a first frequency associated with the inter-modulation interference and interference information of the first frequency channel — 301

Perform, based on the auxiliary information, a processing operation on the frequencies associated with the inter-modulation interference — 302

FIG. 3

INTERFERENCE PROCESSING METHOD, TERMINAL, AND NETWORK-SIDE DEVICE

CROSS-REFERENCE TO RELATED APPLICATIONS

This application is a continuation application of International Application No. PCT/CN2020/097982 filed on Jun. 24, 2020, which claims priority to Chinese Patent Application No. 201910601041.9, filed in China on Jul. 4, 2019, which are incorporated herein by reference in their entireties.

TECHNICAL FIELD

Embodiments of this disclosure relate to the field of communications technologies, and in particular, to an interference processing method, a terminal, and a network-side device.

BACKGROUND

With the development of communications technologies, one terminal can be equipped with a plurality of transceivers that support different RAT radio access technologies (RAT), for example, long term evolution (LTE) wireless transceivers, wireless fidelity Wi-Fi wireless transceivers, Bluetooth wireless transceivers, and global navigation satellite system (GNSS) wireless transceivers.

However, one terminal is equipped with a plurality of transceivers, which is likely to cause interference to the terminal. For example, in adjacent frequencies or harmonic frequency parts, a receiver of terminal may be interfered with by a transmitter of the terminal, resulting in poor communication performance of the terminal.

SUMMARY

Embodiments of this disclosure provide a sending method, an interference processing method, a terminal, and a network-side device This disclosure is implemented as follows:

According to a first aspect, an embodiment of this disclosure provides an interference processing method applied to a terminal, where the method includes:

in a case that inter-modulation interference occurs between frequencies corresponding to different radio access technologies RATs, sending auxiliary information of the inter-modulation interference to a network-side device, where the auxiliary information includes identification information of a first frequency associated with the inter-modulation interference and interference information of the first frequency.

According to a second aspect, an embodiment of this disclosure provides an interference processing method applied to a network-side device, where the method includes:

receiving, from a terminal, auxiliary information of inter-modulation interference occurred between frequencies corresponding to different RATs, where the auxiliary information includes identification information of a first frequency associated with the inter-modulation interference and interference information of the first frequency; and performing, based on the auxiliary information, a processing operation on the frequencies associated with the inter-modulation interference.

According to a third aspect, an embodiment of this disclosure further provides a terminal, where the terminal includes:

a first sending module, configured to, in a case that inter-modulation interference occurs between frequencies corresponding to different radio access technologies RATs, send auxiliary information of the inter-modulation interference to a network-side device, where the auxiliary information includes identification information of a first frequency associated with the inter-modulation interference and interference information of the first frequency.

According to a fourth aspect, an embodiment of this disclosure further provides a network-side device, where the network-side device includes:

a second receiving module, configured to receive, from a terminal, auxiliary information of inter-modulation interference occurred between frequencies corresponding to different RATs, where the auxiliary information includes identification information of a first frequency associated with the inter-modulation interference and interference information of the first frequency; and a processing module, configured to perform, based on the auxiliary information, a processing operation on the frequencies associated with the inter-modulation interference.

According to a fifth aspect, an embodiment of this disclosure further provides a terminal, where the terminal includes a processor, a memory, and a computer program stored in the memory and capable of running on the processor, and when the computer program is executed by the processor, the steps of the interference processing method described above are implemented.

According to a sixth aspect, an embodiment of this disclosure further provides a network-side device, where the network-side device includes a processor, a memory, and a computer program stored in the memory and capable of running on the processor, and when the computer program is executed by the processor, the steps of the interference processing method described above are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings without creative efforts.

FIG. 1 is a structural diagram of a network system to which an embodiment of this disclosure may be applied;

FIG. 2 is a first flowchart of an interference processing method according to an embodiment of this disclosure;

FIG. 3 is a second flowchart of an interference processing method according to an embodiment of this disclosure;

DESCRIPTION OF EMBODIMENTS

Figure 4:
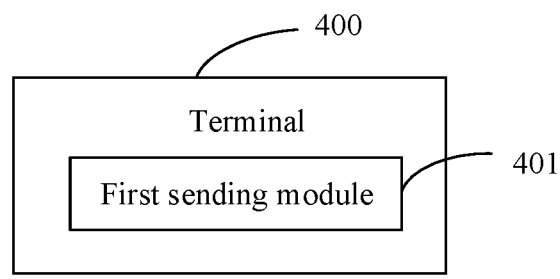
FIG. 4 is a first structural diagram of a terminal according to an embodiment of this disclosure.

The following clearly and completely describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Referring to FIG. 1, FIG. 1 is a structural diagram of a network system to which an embodiment of this disclosure may be applied. As shown in FIG. 1, the network system includes a terminal 11 and a network-side device 12, and communication can be performed between the terminal 11 and the network-side device 12.

In this embodiment of this disclosure, the terminal 11 may also be referred to as user equipment (UE). In actual implementation, the terminal 11 may be a mobile phone, a tablet personal computer, a laptop computer, a personal digital assistant (PDA), a mobile Internet device (MID), a wearable device, an in-vehicle device, or the like. The network-side device 12 may be a base station, a relay, an access point, or the like.

For ease of understanding, the following describes some content involved in the embodiments of this disclosure:

I. In-Device Coexistence (IDC)

One UE may be equipped with a variety of different wireless transceivers, such as long term evolution (LTE) wireless transceivers, 5th generation (5G) wireless transceivers, wireless fidelity Wi-Fi wireless transceivers, Bluetooth wireless transceivers, and global navigation satellite system (GNSS) wireless transceivers. In adjacent frequencies or harmonic frequency parts, a receiver of UE may be interfered with by a transmitter of the UE. Such interference may come from the same or different radio access technologies (RAT).

When the UE has an IDC problem, the UE may report an affected frequency to a network side, where reported information may include:

the affected frequency (for example, f1); and
indication information, indicating whether the affected frequency is an interfering source (interfering with other frequencies, for example, interfering with a frequency corresponding to another RATs (for example, Wi-Fi)) or an interfered target (interfered with by other frequencies).

The indication information may be specifically represented as any of the following:

EUTRA indication information, indicating that the frequency is an interfered target, that is, has been interfered with, for example, downlink reception has been interfered with;

Other indication information, indicating that the frequency is an interfering source, for example, uplink transmission interferes with other RATs; and Both indication information, indicating that the frequency is both an interfering source and an interfered target.

It should be noted that, in the embodiments of this disclosure, the affected frequency may be either the interfering source or the interfered target. The affected frequency may be understood as a frequency involved in the interference, that is, a frequency associated with the interference. In addition, in the embodiments of this disclosure, a frequency and a frequency can be interchanged.

II. Inter-Modulation Interference

In practical application, inter-modulation may be performed on two frequencies at which the UE operates, but the inter-modulation will interfere with other frequencies. For example, inter-modulation is performed on a 3rd Generation Partnership Project (3GPP) frequency f1 and a Wi-Fi frequency f2 at which the UE works, and the inter-modulation interferes with a 3GPP frequency f3.

The following describes the interference processing method in the embodiments of this disclosure.

Referring to FIG. 2, FIG. 2 is a first flowchart of an interference processing method according to an embodiment of this disclosure. The interference processing method shown in FIG. 2 is applied to a terminal.

As shown in FIG. 2, the interference processing method applied to a terminal may include the following steps.

Step 201: In a case that inter-modulation interference occurs between frequencies corresponding to different radio access technologies RATs, send auxiliary information of the inter-modulation interference to a network-side device, where the auxiliary information includes identification information of a first frequency associated with the inter-modulation interference and interference information of the first frequency.

In specific implementation, the inter-modulation interference occurred between the frequencies corresponding to the different RATs may be represented as any of the following:

a frequency between a first RAT and a second RAT causes inter-modulation interference to a frequency corresponding to the first RAT;

a frequency between a first RAT and a second RAT causes inter-modulation interference to a frequency corresponding to the second RAT; and a frequency between a first RAT and a second RAT causes inter-modulation interference to a frequency corresponding to a third RAT; where the first RAT, the second RAT, and the third RAT are different RATs.

Optionally, the different RATs may be: different RATs in 3GPP, code division multiple access (CDMA), CDMA2000, global system for mobile communications (GSM), universal terrestrial radio access (UTRA), evolved universal terrestrial radio access (EUTRA), 5G new radio technologies (NR), wireless fidelity Wi-Fi, Bluetooth, and a positioning system. In addition, the RAT may also be a RAT in a future communications system, such as a 6G RAT.

Further, the positioning system may include at least one of the following:

a global positioning system (GPS);
a global navigation satellite system (GLONASS);
a Bei Dou system (BDS); and
GALILEO.

In the embodiments of this disclosure, the interfering source in the inter-modulation interference may include at least two frequencies, and the interfered target in the inter-modulation interference may include at least one frequency. Any frequency in the interfering source and the interfered target in the inter-modulation interference can be regarded as the frequency associated with the inter-modulation interference.

For example, it is assumed that a frequency 1 of the first RAT and a frequency 2 of the second RAT are inter-modulated, which interferes with a frequency 3 and a frequency 4 of the first RAT. In this inter-modulation interference, the interfering source includes the frequency 1 and the frequency 2, and the interfered target includes the frequency 3 and the frequency 4. Then the frequency 1, frequency 2, frequency 3, and frequency 4 can all be regarded as the frequencies associated with the inter-modulation interference.

Therefore, in specific implementation, the first frequency associated with the inter-modulation interference may be one or more frequencies associated with the inter-modulation interference.

It should be noted that, in a case that the first frequency is more than one, the auxiliary information may include identification information of each of the frequencies and interference information of at least one of the frequencies. For example, assuming that the first frequency includes a frequency 1 and a frequency 2, in an implementation, the auxiliary information may include: identification information of the frequency 1, identification information of the frequency 2, and interference information of the frequency 1; and in another implementation, the auxiliary information may include: identification information of the frequency 1, identification information of the frequency 2, interference information of the frequency 1, and interference information of the frequency 2.

In this embodiment of this disclosure, the identification information of the frequency can help the network-side device directly or indirectly determine the frequency. Optionally, the identification information of the frequency may include at least one of the following:

frequency information of the frequency;
location information of a physical resource block corresponding to the frequency;
information about a bandwidth corresponding to the frequency;
information about a cell corresponding to the frequency;
information about a bandwidth part (BWP) corresponding to the frequency; and
a frequency channel number corresponding to the frequency.

In specific implementation, the frequency information of the frequency can help the network-side device directly determine the frequency. In specific implementation, the frequency information of the frequency may be represented as: an absolute frequency number or a frequency value of the frequency.

There is a correspondence between frequencies and locations of physical resource blocks. For example, assuming that the frequency is a frequency f1 of a primary cell (PCell), a location of a PRB corresponding to the frequency f1 is locations of PRBs 1 to 3. In this way, reporting the location information of the physical resource block (PRB) corresponding to the frequency can help the network-side device indirectly determine the frequency. Specifically, after obtaining the location of the PRB, the network-side device can determine the frequency by searching for the frequency corresponding to the location.

Similarly, there is a correspondence between frequencies and bandwidths. In this way, reporting the information about the bandwidth corresponding to the frequency can help the network-side device indirectly determine the frequency. Specifically, after obtaining the information about the bandwidth, the network-side device can determine the frequency by searching for the frequency corresponding to the bandwidth.

Similarly, there is a correspondence between frequencies and cells. In this way, reporting the information about the cell corresponding to the frequency can help the network-side device indirectly determine the frequency. Specifically, after obtaining the information about the cell, the network-side device can determine the frequency by searching for the frequency corresponding to the cell.

Similarly, there is a correspondence between frequencies and BWPs. In this way, reporting the information about the BWP corresponding to the frequency can help the network-side device indirectly determine the frequency. Specifically, after obtaining the information about the BWP, the network-side device can determine the frequency by searching for the frequency corresponding to the BWP.

The frequency can be divided into a plurality of channels, and each channel is numbered. Therefore, each frequency has a corresponding frequency number. In this way, reporting the frequency channel number corresponding to the frequency can help the network-side device indirectly determine the frequency. Specifically, after obtaining the frequency number, the network-side device can determine the frequency by searching for the frequency corresponding to the number.

For example, a Wi-Fi frequency can be divided into 10 frequencies, and each channel can be numbered. If the frequency associated with the inter-modulation interference is a frequency f1 of NR, and the frequency f1 corresponds to a Wi-Fi common channel, a Wi-Fi channel 2 (whose corresponding frequency is 2.471 gigahertz (GHz)), that is, the frequency f1 is an unlicensed frequency Wi-Fi channel 2, the UE may report the Wi-Fi channel 2. In this way, the network-side device can know that a frequency value of this frequency is 2.471 GHz.

In this embodiment of this disclosure, the interference information of the frequency may implicitly or explicitly indicate that the first frequency is the frequency associated with the inter-modulation interference occurred between the frequencies corresponding to the different RATs, thereby helping the network-side device determine that interference with the UE is inter-modulation interference, so that the network-side device can perform a corresponding processing operation on the frequencies associated with the inter-modulation interference to eliminate the interference.

Optionally, in a case that the first frequency is a frequency corresponding to a first RAT, the interference information of the first frequency includes at least one of the following:

first indication information, used to indicate that the first frequency interferes with a second frequency corresponding to the first RAT;
second indication information, used to indicate that the first frequency is interfered with, by a second frequency corresponding to the first RAT;
third indication information, used to indicate that the first frequency is a frequency associated with the inter-modulation interference; and
fourth indication information, used to indicate that the first frequency interferes with a third frequency corresponding to a second RAT, and indicate that the first frequency is a frequency associated with the inter-modulation interference.

In this optional step, the first indication information and the second indication information both implicitly indicate that the first frequency is the frequency associated with inter-modulation interference occurred between the frequencies corresponding to the different RATs. A difference between the first indication information and the second indication information lies in that the first indication information explicitly indicates that the first frequency is an interfering source in the inter-modulation interference, and that the second indication information explicitly indicates that the first frequency is an interfered target in the inter-modulation interference.

The third indication information and the fourth indication information both explicitly indicate that the first frequency is the frequency associated with the inter-modulation interference occurred between the frequencies corresponding to the different RATs, but do not indicate whether the first frequency is an interfering source or an interfered target in the inter-modulation interference.

It should be noted that the first frequency, the second frequency, and the third frequency each may be provided in one or more.

Further, in a case that the interference information includes at least one of the first indication information and the second indication information, the interference information further includes identification information of the second frequency.

It can be learned from the foregoing that the identification information of the frequency may include at least one of the following: frequency information of the frequency; location information of a physical resource block corresponding to the frequency; and a frequency channel number corresponding to the frequency. Correspondingly, the identification information of the second frequency may include at least one of the following: frequency information of the second frequency; location information of a physical resource block corresponding to the second frequency; and a frequency channel number corresponding to the second frequency.

In the interference processing method according to this embodiment, in a case that inter-modulation interference occurs between frequencies corresponding to different radio access technologies RATs, a terminal sends auxiliary information of the inter-modulation interference to a network-side device, where the auxiliary information includes identification information of a first frequency associated with the inter-modulation interference and interference information of the first frequency. In this way, the network-side device may perform, based on the received auxiliary information of the inter-modulation interference, a processing operation on the frequencies associated with the inter-modulation interference, to eliminate interference, thereby improving communication performance of the terminal and utilization efficiency of the frequency.

In addition, the first frequency is the frequency associated with the inter-modulation interference. Specifically, the first frequency may include at least one of the following: at least one interfering source and at least one interfered target. In this way, the network-side device can process the interfering source and/or the interfered target in the inter-modulation interference, for example, removing the interfering source and/or the interfered target in the inter-modulation interference, or controlling the interfering source and/or the interfered target in the inter-modulation interference to perform time-division transmission (for example, time-division reception), thereby improving flexibility of processing the frequencies associated with the inter-modulation interference, improving frequency utilization and improving communication performance of the terminal.

In this embodiment of this disclosure, the terminal can also perform a processing operation on the frequencies associated with the inter-modulation interference to eliminate the interference. Therefore, compared with the processing operation performed by the network-side device on the frequencies associated with the inter-modulation interference to eliminate interference, this manner can improve efficiency of interference elimination. In addition, the terminal may not report the auxiliary information, thereby reducing signaling overheads and reducing operating load on the network side.

Therefore, optionally, after the sending auxiliary information of inter-modulation interference to a network-side device, the method further includes:

controlling at least two of the frequencies associated with the inter-modulation interference for transmission at different occasions.

Transmission may be specifically represented as sending or receiving, and its specific form is determined based on the frequency.

Further, the controlling at least two of the frequencies associated with the inter-modulation interference for transmission at different occasions includes at least one of the following:

controlling the at least two of the frequencies associated with the inter-modulation interference for sending at different occasions; and controlling the at least two of the frequencies associated with the inter-modulation interference for sending and receiving at different occasions.

In a case that the transmission is specifically represented as sending, the at least two frequencies are interfering sources; in a case that the transmission is specifically represented as sending and receiving, the at least two frequencies include an interfering source and an interfered target.

During specific implementation, in an implementation, the terminal may autonomously control the at least two of the frequencies associated with the inter-modulation interference for transmission at different occasions.

In another implementation, the terminal may also control, based on an indication from the network-side device, the at least two of the frequencies associated with the inter-modulation interference for transmission at different occasions. In this implementation, optionally, the controlling at least two of the frequencies associated with the inter-modulation interference for transmission at different occasions includes:

receiving first configuration information sent by the network-side device; and in a case that the first configuration information is used to configure the terminal to control the at least two of the frequencies associated with the inter-modulation interference for transmission at different occasions, controlling the at least two of the frequencies associated with the inter-modulation interference for transmission at different occasions.

In this optional step, the first configuration information may be used to configure allowing or disallowing the terminal to control the at least two of the frequencies associated with the inter-modulation interference for transmission at different occasions.

In specific implementation, the first configuration information may carry one bit, where a value "0" of this bit means allowing the terminal to control the at least two of the frequencies associated with the inter-modulation interference for transmission at different occasions, and a value "1" of this bit means disallowing the terminal to control the at least two of the frequencies associated with the inter-modulation interference for transmission at different occasions.

The specific configuration information of the first configuration information is specifically determined based on actual situations. For example, if the network-side device has performed an interference elimination operation, the first configuration information may be configured as disallowing; if the network-side device has not performed an interference elimination operation, the first configuration information may be configured as allowing.

In this way, compared with the implementation of autonomous control by the terminal, this implementation can prevent the terminal and the network side from repeatedly performing an interference elimination operation, thereby improving effectiveness of the interference elimination operation.

In the embodiments of this disclosure, considering that the terminal can autonomously perform the interference elimination operation, the reporting of auxiliary information is an optional operation. Optionally, before the sending, in a case that inter-modulation interference occurs between frequencies corresponding to different radio access technologies RATs, auxiliary information of the inter-modulation interference to a network-side device, the method further includes:
  receiving second configuration information sent by the network-side device; and
  the sending, in a case that inter-modulation interference occurs between frequencies corresponding to different radio access technologies RATs, auxiliary information of the inter-modulation interference to a network-side device includes:
  if the second configuration information is used to configure allowing the terminal to send the auxiliary information of the inter-modulation interference, in a case that the inter-modulation interference occurs between the frequencies corresponding to the different radio access technologies RATs, sending the auxiliary information of the inter-modulation interference to the network-side device.

In this optional step, if the second configuration information may be used to configure allowing or disallowing the terminal to send the auxiliary information of the inter-modulation interference, in a case that the inter-modulation interference occurs between the frequencies corresponding to the different RATs, sending the auxiliary information of the inter-modulation interference to the network-side device.

In specific implementation, the second configuration information may carry one bit, where a value "0" of this bit means allowing the terminal to send the auxiliary information of the inter-modulation interference, that is, in a case that the inter-modulation interference occurs between the frequencies corresponding to the different RATs, sending the auxiliary information of the inter-modulation interference to the network-side device; and a value "1" of this bit means disallowing the terminal to send the auxiliary information of the inter-modulation interference, that is, in a case that the inter-modulation interference occurs between the frequencies corresponding to the different RATs, skipping sending the auxiliary information of the inter-modulation interference to the network-side device.

The specific configuration information of the second configuration information is specifically determined based on actual situations. For example, if the network-side device tends to allow the UE to eliminate interference autonomously, the second configuration information may be configured as disallowing; if the network-side device tends to help the UE eliminate interference, the second configuration information may be configured as allowing.

In this way, a frequency of reporting the auxiliary information can be reduced, thereby reducing signaling overheads.

Referring to FIG. 3, FIG. 3 is a first flowchart of an interference processing method according to an embodiment of this disclosure. The interference processing method according to this embodiment of this disclosure is applied to a network-side device.

As shown in FIG. 3, the interference processing method may include the following steps.

Step 301: Receive, from a terminal, auxiliary information of inter-modulation interference occurred between frequencies corresponding to different RATs, where the auxiliary information includes identification information of a first frequency associated with the inter-modulation interference and interference information of the first frequency.

Optionally, in a case that the first frequency is a frequency corresponding to a first RAT, the interference information of the first frequency includes at least one of the following:
  first indication information, used to indicate that the first frequency interferes with a second frequency corresponding to the first RAT;
  second indication information, used to indicate that the first frequency is interfered with, by a second frequency corresponding to the first RAT;
  third indication information, used to indicate that the first frequency is a frequency associated with the inter-modulation interference; and
  fourth indication information, used to indicate that the first frequency interferes with a third frequency corresponding to a second RAT, and indicate that the first frequency is a frequency associated with the inter-modulation interference.

Optionally, in a case that the interference information includes at least one of the first indication information and the second indication information, the interference information further includes identification information of the second frequency.

Optionally, the identification information includes at least one of the following:
  frequency information of the frequency;
  location information of a physical resource block corresponding to the frequency;
  information about a bandwidth corresponding to the frequency;
  information about a cell corresponding to the frequency;
  information about a bandwidth part BWP corresponding to the frequency; and
  a frequency channel number corresponding to the frequency.

Step 302: Perform, based on the auxiliary information, a processing operation on the frequencies associated with the inter-modulation interference.

In specific implementation, optionally, the performing, based on the auxiliary information, a processing operation on the frequencies associated with the inter-modulation interference includes any one of the following:

in a case that the network-side device supports a first RAT and the first frequency is a frequency corresponding to the first RAT, removing at least one frequency, corresponding to the first RAT, of the frequencies associated with the inter-modulation interference; and sending first configuration information to the terminal, where the first configuration information is used to configure the terminal to control at least two of the frequencies associated with the inter-modulation interference for transmission at different occasions.

For example, assuming that the auxiliary information includes: identification information of a frequency 1 corresponding to the first RAT, and interference information of the frequency 1, and that the interference information indicates that the frequency 1 is interfered with by a frequency 2 and a frequency 3 that correspond to the first RAT, the network-side device may remove at least one of the frequency 1, the frequency 2, and the frequency 3, thereby eliminating interference.

Further, the first configuration information is specifically used to complete at least one of the following:

configuring the terminal to control the at least two of the frequencies associated with the inter-modulation interference for sending at different occasions; and configuring the terminal to control at least two of the frequencies associated with the inter-modulation interference for sending and receiving at different occasions.

Optionally, before the receiving, from a terminal, auxiliary information of inter-modulation interference occurred between frequencies corresponding to different RATs, the method further includes:

sending second configuration information to the terminal, where the second configuration information is used to configure allowing the terminal to send the auxiliary information of the inter-modulation interference.

In the interference processing method according to this embodiment, the network-side device receives, from a terminal, auxiliary information of inter-modulation interference occurred between frequencies corresponding to different RATs, where the auxiliary information includes identification information of a first frequency associated with the inter-modulation interference and interference information of the first frequency. In this way, the network-side device may perform, based on the received auxiliary information of the inter-modulation interference, a processing operation on the frequencies associated with the inter-modulation interference, to eliminate interference, thereby improving communication performance of the terminal and utilization efficiency of the frequency.

It should be noted that this embodiment serves as an embodiment of the network-side device corresponding to the foregoing method embodiment. Therefore, reference may be made to the related description in the foregoing method embodiment, and a same beneficial effect can be achieved. To avoid repetition, details are not described herein again.

It should be noted that various optional implementations described in the embodiments of this disclosure may be implemented in combination or may be implemented separately, which is not limited in this embodiment of this disclosure.

For ease of understanding, an example is described as follows:

The interference processing method may include the following steps.

Step I: A network side configures on/off information about whether to allow UE to report interference auxiliary information. (For example, 1 bit, with a value "0" meaning that UE cannot report auxiliary information of inter-modulation interference, and a value "1" meaning that UE can report auxiliary information of inter-modulation interference).

Step II: According to the on/off information in Step I or UE autonomy, the UE reports the interference auxiliary information to the network side in a case that interference occurs. The interference auxiliary information includes at least one of the following content:

an affected frequency 1 corresponding to RAT1, and that the frequency 1 corresponding to RAT1 affects another frequency corresponding to RAT1 (for example, the UE reports that a frequency 1 corresponding to 3GPP is affected, and indicates that the frequency 1 corresponding to 3GPP interferes another frequency corresponding to 3GPP (that is, indicates mutual interference of the same RAT)); where additionally, the UE may indicate a frequency 2 corresponding to RAT1 that is interfered with by the frequency 1 corresponding to RAT1;

an affected frequency 1 corresponding to RAT1, and that the frequency 1 corresponding to RAT1 is interfered with by another frequency corresponding to RAT1 (for example, the UE reports that a frequency 1 corresponding to 3GPP is affected, and indicates that the frequency 1 is interfered with by another frequency corresponding to 3GPP (that is, indicates mutual interference of the same RAT)); where additionally, the UE may indicate a corresponding frequency 2 corresponding to RAT1 that interferes with the frequency 1 corresponding to RAT1;

an affected frequency corresponding to RAT1, and that the frequency corresponding to RAT1 is affected by inter-modulation interference between frequencies corresponding to RAT1 and RAT2 (for example, the UE reports that a frequency 1 corresponding to 3GPP is affected, and indicates that the frequency is affected by inter-modulation interference, where the frequency may be an interfering source or an interfered target); and an affected frequency corresponding to RAT1, and that the affected frequency corresponding to RAT1 serves as an interfering source that interferes with other RAT types, where in a case that an interfered RAT type is different from RAT1, the UE needs to additionally report that the interference is caused by inter-modulation interference between frequencies corresponding to RAT1 and RAT2 (for example, the UE reports that a frequency 1 corresponding to 3GPP NR is affected, and indicates that a RAT with which the frequency 1 corresponding to 3GPP NR interferes is also NR (for example, another frequency 2 corresponding to NR), which implicitly indicates that the interference is caused by inter-modulation interference between frequencies corresponding to RAT1 and RAT2; or the UE reports that a frequency 1 corresponding to 3GPP NR is affected, and indicates that a RAT with which the frequency 1 corresponding to 3GPP NR interferes is RAT2 (for example, Wi-Fi), and in this case, the UE needs to indicate that the interference is caused by inter-modulation interference between the frequencies corresponding to RAT1 and RAT2).

The "RAT type" includes at least one of the following: CDMA; CDMA2000; GSM; UTRA; EUTRA; 5G NR; Wi-Fi; Bluetooth; and a positioning system.

The "positioning system" includes at least one of the following: GPS; GLONASS; BDS; and GALILEO.

Frequency-related information of the affected frequency includes at least one of the following:
- a location of a PRB corresponding to the affected frequency (for example, the affected frequency of the UE is a frequency f1 corresponding to a PCell, and a location of a PRB corresponding to f1 is locations of PRBs 1 to 3); and
- a frequency channel number of the affected frequency (for example, the affected frequencies of the UE are f1 corresponding to NR (using an unlicensed frequency Wi-Fi channel 2), and a Wi-Fi common Wi-Fi channel 2 (whose corresponding frequency is 2.417 GHz), and the UE may be an interfered target or an interfering source at f1 corresponding to NR, the UE reports that the affected frequency is a Wi-Fi frequency (for example, the Wi-Fi channel 2)).

Step III. According to the auxiliary information reported in step II, the network side may separately process a plurality of frequencies corresponding to 3GPP affected by the inter-modulation interference (for example, if the UE reports that a frequency 1 corresponding to 3GPP interferes with a frequency 2 corresponding to 3GPP due to inter-modulation interference, the network side may remove either the frequency 1 corresponding to 3GPP or the frequency 2 corresponding to 3GPP to resolve the problem; or the network side may allow the UE to send at the frequency 1 corresponding to 3GPP (interfering source) and receive at the frequency 2 corresponding to 3GPP (interfered target) at different occasions).

The terminal according to this embodiment of this disclosure can report the problem caused by inter-modulation interference between frequencies corresponding to 3GPP and frequencies corresponding to other RATs to the network side, and the network side enables, according to the information of the "reported interference problem caused by the inter-modulation", the UE to send and receive at the two affected frequencies corresponding to 3GPP at different occasions.

Through this embodiment of this disclosure, the network side can distinguish whether interference received by the UE is caused by inter-modulation interference, so that the network side can process a plurality of frequencies more flexibly (for example, enabling two affected frequencies corresponding to 3GPP to send and receive at different occasions), thereby improving frequency utilization efficiency.

Referring to FIG. 4, FIG. 4 is a first structural diagram of a terminal according to an embodiment of this disclosure. As shown in FIG. 4, the terminal 400 includes:
- a first sending module 401, configured to, in a case that inter-modulation interference occurs between frequencies corresponding to different radio access technologies RATs, send auxiliary information of the inter-modulation interference to a network-side device, where the auxiliary information includes identification information of a first frequency associated with the inter-modulation interference and interference information of the first frequency.

Optionally, in a case that the first frequency is a frequency corresponding to a first RAT, the interference information of the first frequency includes at least one of the following:
- first indication information, used to indicate that the first frequency interferes with a second frequency corresponding to the first RAT;
- second indication information, used to indicate that the first frequency is interfered with, by a second frequency corresponding to the first RAT;
- third indication information, used to indicate that the first frequency is a frequency associated with the inter-modulation interference; and
- fourth indication information, used to indicate that the first frequency interferes with a third frequency corresponding to a second RAT, and indicate that the first frequency is a frequency associated with the inter-modulation interference.

Optionally, in a case that the interference information includes at least one of the first indication information and the second indication information, the interference information further includes identification information of the second frequency.

Optionally, the identification information includes at least one of the following:
- frequency information of the frequency;
- location information of a physical resource block corresponding to the frequency;
- information about a bandwidth corresponding to the frequency;
- information about a cell corresponding to the frequency;
- information about a bandwidth part BWP corresponding to the frequency; and
- a frequency channel number corresponding to the frequency.

Optionally, the terminal 400 further includes:
- a control module, configured to control at least two of the frequencies associated with the inter-modulation interference for transmission at different occasions.

Optionally, the control module is specifically configured to perform any one of the following operations:
- controlling the at least two of the frequencies associated with the inter-modulation interference for sending at different occasions; and
- controlling the at least two of the frequencies associated with the inter-modulation interference for sending and receiving at different occasions.

Optionally, the control module includes:
- a receiving unit, configured to receive first configuration information sent by the network-side device; and
- a control unit, configured to, in a case that the first configuration information is used to configure the terminal 400 to control the at least two of the frequencies associated with the inter-modulation interference for transmission at different occasions, control the at least two of the frequencies associated with the inter-modulation interference for transmission at different occasions.

Optionally, the terminal 400 further includes:
- a first receiving module, configured to, in a case that inter-modulation interference occurs between frequencies corresponding to different radio access technologies RATs, before auxiliary information of the inter-modulation interference is sent to the network-side device, receive the second configuration information sent by the network-side device.

The first sending module 401 is specifically configured to:
- if the second configuration information is used to configure allowing the terminal 400 to send the auxiliary information of the inter-modulation interference, in a case that the inter-modulation interference occurs between the frequencies corresponding to the different radio access technologies RATs, send the auxiliary information of the inter-modulation interference to the network-side device.

The terminal 400 can implement the processes that can be implemented by the terminal in the method embodiments of this disclosure, with the same beneficial effects achieved. To avoid repetition, details are not described herein again.

Figure 5:
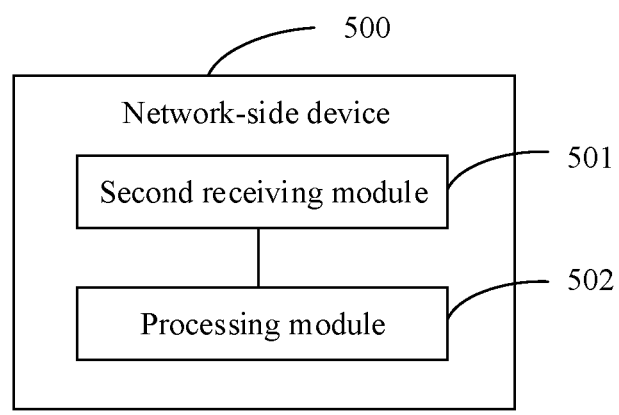
FIG. 5 is a first structural diagram of a network-side device according to an embodiment of this disclosure.

Referring to FIG. 5, FIG. 5 is a first structural diagram of a network-side device 500 according to an embodiment of this disclosure. As shown in FIG. 5, the network-side device 500 includes:

a second receiving module 501, configured to receive, from a terminal, auxiliary information of inter-modulation interference occurred between frequencies corresponding to different RATs, where the auxiliary information includes identification information of a first frequency associated with the inter-modulation interference and interference information of the first frequency; and a processing module 502, configured to perform, based on the auxiliary information, a processing operation on the frequencies associated with the inter-modulation interference.

Optionally, in a case that the first frequency is a frequency corresponding to a first RAT, the interference information of the first frequency includes at least one of the following:

first indication information, used to indicate that the first frequency interferes with a second frequency corresponding to the first RAT;

second indication information, used to indicate that the first frequency is interfered with, by a second frequency corresponding to the first RAT;

third indication information, used to indicate that the first frequency is a frequency associated with the inter-modulation interference; and fourth indication information, used to indicate that the first frequency interferes with a third frequency corresponding to a second RAT, and indicate that the first frequency is a frequency associated with the inter-modulation interference.

Optionally, in a case that the interference information includes at least one of the first indication information and the second indication information, the interference information further includes identification information of the second frequency.

Optionally, the identification information includes at least one of the following:

frequency information of the frequency;

location information of a physical resource block corresponding to the frequency;

information about a bandwidth corresponding to the frequency;

information about a cell corresponding to the frequency;

information about a bandwidth part BWP corresponding to the frequency; and a frequency channel number corresponding to the frequency.

Optionally, the processing module 502 is specifically configured to perform any one of the following operations:

in a case that the network-side device 500 supports a first RAT and the first frequency is a frequency corresponding to the first RAT, removing at least one frequency, corresponding to the first RAT, of the frequencies associated with the inter-modulation interference; and sending first configuration information to the terminal, where the first configuration information is used to configure the terminal to control at least two of the frequencies associated with the inter-modulation interference for transmission at different occasions.

Optionally, the first configuration information is specifically used to complete at least one of the following:

configuring the terminal to control the at least two of the frequencies associated with the inter-modulation interference for sending at different occasions; and configuring the terminal to control at least two of the frequencies associated with the inter-modulation interference for sending and receiving at different occasions.

Optionally, the network-side device 500 further includes:

a second sending module, configured to, before the auxiliary information of inter-modulation interference occurred between the frequencies corresponding to different RATs is received from the terminal, send second configuration information to the terminal, where the second configuration information is used to configure allowing the terminal to send the auxiliary information of the inter-modulation interference.

The network-side device 500 can implement the processes that can be implemented by the network-side device in the method embodiments of this disclosure, with the same beneficial effects achieved. To avoid repetition, details are not described herein again.

Figure 6:
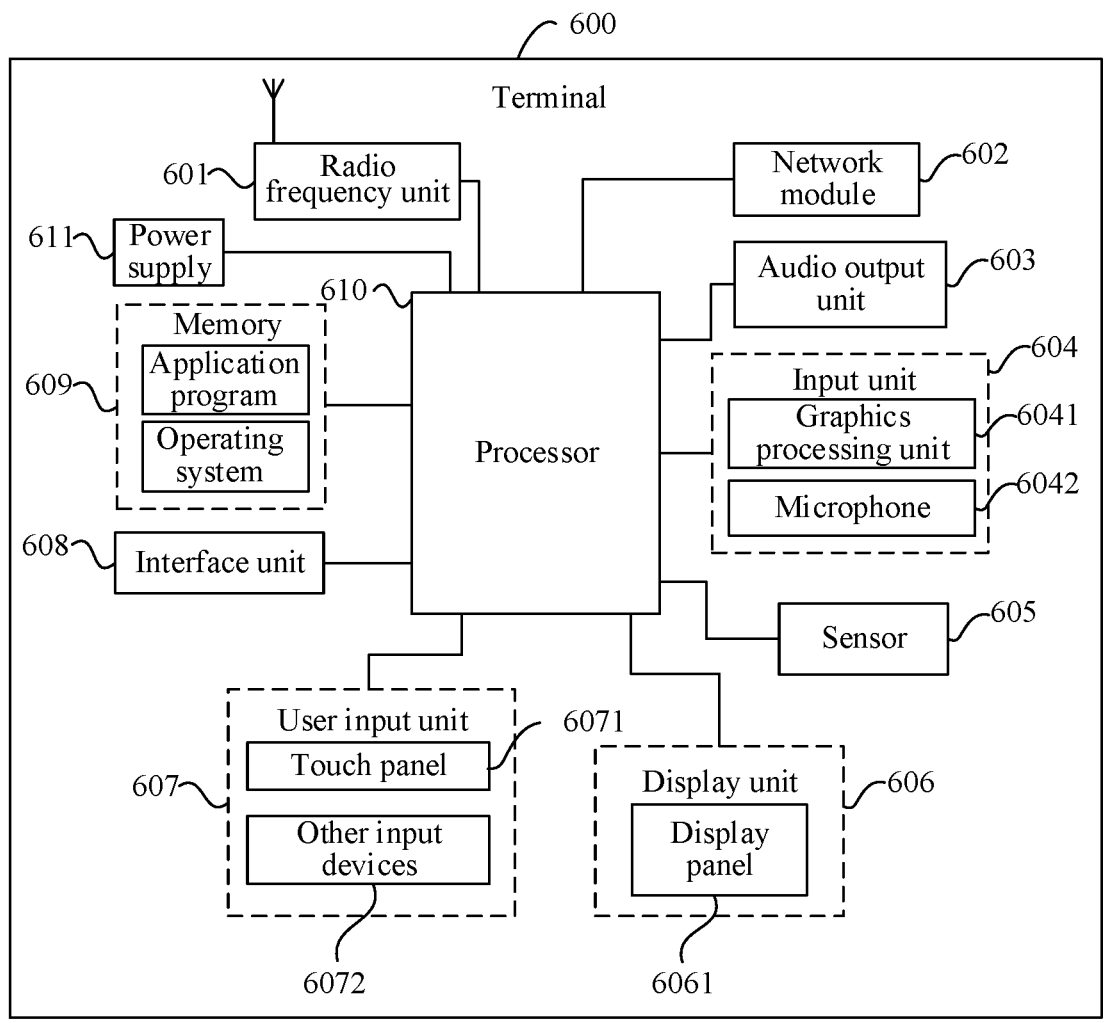
FIG. 6 is a second structural diagram of a terminal according to an embodiment of this disclosure.

Referring to FIG. 6, FIG. 6 is a second structural diagram of a terminal according to an embodiment of this disclosure, showing a hardware structure of a terminal that implements the embodiments of this disclosure. As shown in FIG. 6, the terminal 600 includes but is not limited to parts such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art can understand that the structure of the terminal shown in FIG. 6 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 601 is configured to:

in a case that inter-modulation interference occurs between frequencies corresponding to different radio access technologies RATs, send auxiliary information of the inter-modulation interference to a network-side device, where the auxiliary information includes identification information of a first frequency associated with the inter-modulation interference and interference information of the first frequency.

Optionally, in a case that the first frequency is a frequency corresponding to a first RAT, the interference information of the first frequency includes at least one of the following:

first indication information, used to indicate that the first frequency interferes with a second frequency corresponding to the first RAT;

second indication information, used to indicate that the first frequency is interfered with, by a second frequency corresponding to the first RAT;

third indication information, used to indicate that the first frequency is a frequency associated with the inter-modulation interference; and fourth indication information, used to indicate that the first frequency interferes with a third frequency corresponding to a second RAT, and indicate that the first frequency is a frequency associated with the inter-modulation interference.

Optionally, in a case that the interference information includes at least one of the first indication information and the second indication information, the interference information further includes identification information of the second frequency.

Optionally, the identification information includes at least one of the following:
- frequency information of the frequency;
- location information of a physical resource block corresponding to the frequency;
- information about a bandwidth corresponding to the frequency;
- information about a cell corresponding to the frequency;
- information about a bandwidth part BWP corresponding to the frequency; and
- a frequency channel number corresponding to the frequency.

Optionally, the processor 610 is configured to:
control at least two of the frequencies associated with the inter-modulation interference for transmission at different occasions.

Optionally, the processor 610 is specifically configured to:
control the at least two of the frequencies associated with the inter-modulation interference for sending at different occasions; and
control the at least two of the frequencies associated with the inter-modulation interference for sending and receiving at different occasions.

Optionally, the radio frequency unit 601 is further configured to receive first configuration information sent by the network-side device.

The processor 610 is specifically configured to, in a case that the first configuration information is used to configure the terminal to control the at least two of the frequencies associated with the inter-modulation interference for transmission at different occasions, control the at least two of the frequencies associated with the inter-modulation interference for transmission at different occasions.

Optionally, the radio frequency unit 601 is further configured to:
receive second configuration information sent by the network-side device; and
if the second configuration information is used to configure allowing the terminal to send the auxiliary information of the inter-modulation interference, in a case that the inter-modulation interference occurs between the frequencies corresponding to the different radio access technologies RATs, send the auxiliary information of the inter-modulation interference to the network-side device.

It should be noted that the foregoing terminal 600 in this embodiment is capable of implementing the processes of the method embodiments in the embodiments of this disclosure, with the same beneficial effects achieved. To avoid repetition, details are not described herein again.

It should be understood that, in this embodiment of this disclosure, the radio frequency unit 601 may be configured to send or receive a signal in an information sending/receiving or call process. Specifically, the radio frequency unit 601 receives downlink data from a base station and transmits the downlink data to the processor 610 for processing; and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides a user with wireless broadband Internet access through the network module 602, for example, helping the user to send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal received tone or a message received tone) that is related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 is capable of receiving sounds and processing such sounds into audio data. The processed audio data can be converted in a telephone call mode into a format that can be sent by the radio frequency unit 601 to a mobile communication base station, for outputting.

The terminal 600 may further include at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 605 may further include a fingerprint sensor, a pressure sensor, an iris sensor, a molecular sensor, a gyroscope, a barometer, a hygrometer, a thermometer, an infrared sensor, and the like. Details are not further described herein.

The display unit 606 is configured to display information input by the user or information provided to the user. The display unit 606 may include the display panel 6061. The display panel 6061 may be configured in a form of a liquid crystal display (LCD), an organic light-emitting diode (OLED), or the like.

The user input unit 607 may be configured to receive input digit or character information, and generate key signal input associated with user settings and function control of the terminal. Specifically, the user input unit 607 includes a touch panel 6071 and other input devices 6072. The touch panel 6071, or referred to as a touchscreen, may capture a touch operation performed by a user on or near the touch panel 6071 (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 610, and receives and executes a command sent by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. In FIG. 6, the touch panel 6071 and the display panel 6061 serve as two separate components to implement input and output functions of the terminal. However, in some embodiments, the touch panel 6071 and the display panel 6061 may be integrated to implement the input and output functions of the terminal. This is not specifically limited herein.

The interface unit 608 is an interface between an external apparatus and the terminal 600. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 608 may be configured to receive an input (for example, data information or power) from the external apparatus and send the received input to one or more elements within the terminal 600, or may be configured to send data between the terminal 600 and the external apparatus.

The memory 609 may be configured to store software programs and various data. The memory 609 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory such as a disk storage device, a flash memory device, or another volatile solid-state storage device.

The processor 610 is a control center of the terminal, and is connected to all components of the terminal by using various interfaces and lines. By running or executing software programs and/or modules that are stored in the memory 609 and calling data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may alternatively be not integrated in the processor 610.

The terminal 600 may further include the power supply 611 (for example, a battery) that supplies power to each component. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, the processes in the foregoing embodiments of the interference processing method are implemented, and a same technical effect can be achieved. To avoid repetition, details are not described herein again.

Figure 7:
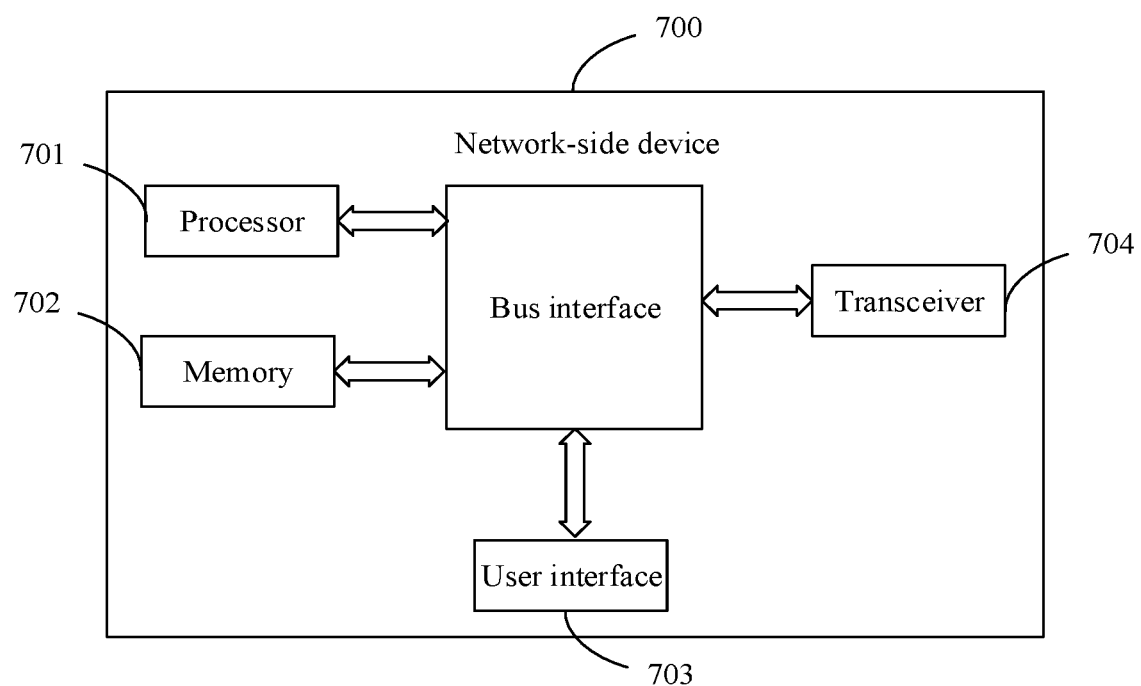
FIG. 7 is a second structural diagram of a network-side device according to an embodiment of this disclosure.

Referring to FIG. 7, FIG. 7 is a second structural diagram of a network-side device according to an embodiment of this disclosure. As shown in FIG. 7, a network-side device 700 includes a processor 701, a memory 702, a user interface 703, a transceiver 704, and a bus interface.

In this embodiment of this disclosure, the network-side device 700 further includes a computer program stored in the memory 702 and capable of running on the processor 701. When the computer program is executed by the processor 701, the following steps are implemented:

receiving, from a terminal by using the transceiver 704, auxiliary information of inter-modulation interference occurred between frequencies corresponding to different RATs, where the auxiliary information includes identification information of a first frequency associated with the inter-modulation interference and inter-ference information of the first frequency; and performing, based on the auxiliary information, a processing operation on the frequencies associated with the inter-modulation interference.

In FIG. 7, a bus architecture may include any quantity of interconnected buses and bridges, and specifically connect together various circuits of one or more processors represented by the processor 701 and a memory represented by the memory 702. The bus architecture may further interconnect various other circuits such as a peripheral device, a voltage regulator, and a power management circuit. These are all common sense in the art, and therefore are not further described in this specification. The bus interface provides an interface. The transceiver 704 may be a plurality of components, that is, the transceiver 704 includes a transmitter and a receiver, and provides a unit for communicating with various other apparatuses on a transmission medium. For different user equipment, the user interface 703 may also be an interface that can be externally or internally connected to a required device, and the connected device includes but is not limited to a keypad, a display, a speaker, a microphone, a joystick, and the like.

The processor 701 is responsible for management of the bus architecture and general processing, and the memory 702 may store data for use by the processor 701 when the processor 701 performs an operation.

Optionally, in a case that the first frequency is a frequency corresponding to a first RAT, the interference information of the first frequency includes at least one of the following:

first indication information, used to indicate that the first frequency interferes with a second frequency corresponding to the first RAT;

second indication information, used to indicate that the first frequency is interfered with, by a second frequency corresponding to the first RAT;

third indication information, used to indicate that the first frequency is a frequency associated with the inter-modulation interference; and fourth indication information, used to indicate that the first frequency interferes with a third frequency corresponding to a second RAT, and indicate that the first frequency is a frequency associated with the inter-modulation interference.

Optionally, in a case that the interference information includes at least one of the first indication information and the second indication information, the interference information further includes identification information of the second frequency.

Optionally, the identification information includes at least one of the following:

frequency information of the frequency;

location information of a physical resource block corresponding to the frequency;

information about a bandwidth corresponding to the frequency;

information about a cell corresponding to the frequency;

information about a bandwidth part BWP corresponding to the frequency; and a frequency channel number corresponding to the frequency.

Optionally, when the computer program is executed by the processor 701, any of the following steps may be further implemented:

in a case that the network-side device supports a first RAT and the first frequency is a frequency corresponding to the first RAT, removing at least one frequency, corresponding to the first RAT, of the frequencies associated with the inter-modulation interference; and sending first configuration information to the terminal through the transceiver 704, where the first configuration information is used to configure the terminal to control at least two of the frequencies associated with the inter-modulation interference for transmission at different occasions.

Optionally, the first configuration information is specifically used to complete at least one of the following:

configuring the terminal to control the at least two of the frequencies associated with the inter-modulation interference for sending at different occasions; and configuring the terminal to control at least two of the frequencies associated with the inter-modulation interference for sending and receiving at different occasions.

Optionally, when the computer program is executed by the processor 701, the following step may be further implemented:

sending second configuration information to the terminal through the transceiver 704, where the second configuration information is used to configure allowing the terminal to send the auxiliary information of the inter-modulation interference.

The network-side device 700 is capable of implementing the processes implemented by the network-side device in the foregoing method embodiments. To avoid repetition, details are not described herein again.

An embodiment of this disclosure further provides a computer-readable storage medium, where the computer-readable storage medium stores a computer program. When the computer program is executed by a processor, the processes of the interference processing method applied to a terminal or a network-side device in the foregoing embodiments are implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An interference processing method, applied to a terminal and comprising:

in a case that inter-modulation interference occurs between frequencies corresponding to different radio access technologies RATs, sending auxiliary information of the inter-modulation interference to a network-side device, wherein the auxiliary information comprises identification information of a first frequency associated with the inter-modulation interference and interference information of the first frequency;

wherein the identification information comprises at least one of the following:

location information of a physical resource block corresponding to the frequency;

information about a cell corresponding to the frequency;

information about a bandwidth part BWP corresponding to the frequency; and a frequency channel number corresponding to the frequency.

2. The method according to claim 1, wherein in a case that the first frequency is a frequency corresponding to a first RAT, the interference information of the first frequency comprises at least one of the following:

first indication information, used to indicate that the first frequency interferes with a second frequency corresponding to the first RAT;

second indication information, used to indicate that the first frequency is interfered with, by a second frequency corresponding to the first RAT;

third indication information, used to indicate that the first frequency is a frequency associated with the inter-modulation interference; and fourth indication information, used to indicate that the first frequency interferes with a third frequency corresponding to a second RAT, and indicate that the first frequency is a frequency associated with the inter-modulation interference.

3. The method according to claim 2, wherein in a case that the interference information comprises at least one of the first indication information and the second indication information, the interference information further comprises identification information of the second frequency.

4. The method according to claim 1, wherein after the sending auxiliary information of the inter-modulation interference to a network-side device, the method further comprises:

controlling at least two of the frequencies associated with the inter-modulation interference for transmission at different occasions.

5. The method according to claim 4, wherein the controlling at least two of the frequencies associated with the inter-modulation interference for transmission at different occasions comprises at least one of the following:

controlling the at least two of the frequencies associated with the inter-modulation interference for sending at different occasions; and controlling the at least two of the frequencies associated with the inter-modulation interference for sending and receiving at different occasions.

6. The method according to claim 4, wherein the controlling at least two of the frequencies associated with the inter-modulation interference for transmission at different occasions comprises:

receiving first configuration information sent by the network-side device; and in a case that the first configuration information is used to configure the terminal to control the at least two of the frequencies associated with the inter-modulation interference for transmission at different occasions, controlling the at least two of the frequencies associated with the inter-modulation interference for transmission at different occasions.

7. The method according to claim 1, wherein before the sending, in a case that inter-modulation interference occurs between frequencies corresponding to different radio access technologies RATs, auxiliary information of the inter-modulation interference to a network-side device, the method further comprises:

receiving second configuration information sent by the network-side device; and the sending, in a case that inter-modulation interference occurs between frequencies corresponding to different radio access technologies RATs, auxiliary information of the inter-modulation interference to a network-side device comprises:

if the second configuration information is used to configure allowing the terminal to send the auxiliary information of the inter-modulation interference, in a case that the inter-modulation interference occurs between the frequencies corresponding to the different radio access technologies RATs, sending the auxiliary information of the inter-modulation interference to the network-side device.

8. An interference processing method, applied to a network-side device and comprising:

receiving, from a terminal, auxiliary information of inter-modulation interference occurred between frequencies corresponding to different RATs, wherein the auxiliary information comprises identification information of a first frequency associated with the inter-modulation interference and interference information of the first frequency; and performing, based on the auxiliary information, a processing operation on the frequencies associated with the inter-modulation interference;

wherein the identification information comprises at least one of the following:

location information of a physical resource block corresponding to the frequency;

information about a cell corresponding to the frequency;

information about a bandwidth part BWP corresponding to the frequency; and a frequency channel number corresponding to the frequency.

9. The method according to claim 8, wherein in a case that the first frequency is a frequency corresponding to a first RAT, the interference information of the first frequency comprises at least one of the following:

first indication information, used to indicate that the first frequency interferes with a second frequency corresponding to the first RAT;

second indication information, used to indicate that the first frequency is interfered with, by a second frequency corresponding to the first RAT;

third indication information, used to indicate that the first frequency is a frequency associated with the inter-modulation interference; and fourth indication information, used to indicate that the first frequency interferes with a third frequency corresponding to a second RAT, and indicate that the first frequency is a frequency associated with the inter-modulation interference.

10. The method according to claim 9, wherein in a case that the interference information comprises at least one of the first indication information and the second indication information, the interference information further comprises identification information of the second frequency.

11. The method according to claim 8, wherein the performing, based on the auxiliary information, a processing operation on the frequencies associated with the inter-modulation interference comprises any one of the following:

in a case that the network-side device supports a first RAT and the first frequency is a frequency corresponding to the first RAT, removing at least one frequency, corresponding to the first RAT, of the frequencies associated with the inter-modulation interference; and sending first configuration information to the terminal, wherein the first configuration information is used to configure the terminal to control at least two of the frequencies associated with the inter-modulation interference for transmission at different occasions.

12. The method according to claim 11, wherein the first configuration information is specifically used to complete at least one of the following:
configuring the terminal to control the at least two of the frequencies associated with the inter-modulation interference for sending at different occasions; and
configuring the terminal to control at least two of the frequencies associated with the inter-modulation interference for sending and receiving at different occasions.

13. The method according to claim 8, wherein before the receiving, from a terminal, auxiliary information of inter-modulation interference occurred between frequencies corresponding to different RATs, the method further comprises:
sending second configuration information to the terminal, wherein the second configuration information is used to configure allowing the terminal to send the auxiliary information of the inter-modulation interference.

14. A terminal, comprising a processor, a memory, and a computer program stored in the memory and capable of running on the processor, wherein when the computer program is executed by the processor, the steps of the interference processing method are implemented, wherein the method comprises:
in a case that inter-modulation interference occurs between frequencies corresponding to different radio access technologies RATs, sending auxiliary information of the inter-modulation interference to a network-side device, wherein the auxiliary information comprises identification information of a first frequency associated with the inter-modulation interference and interference information of the first frequency;
wherein the identification information comprises at least one of the following:
location information of a physical resource block corresponding to the frequency;
information about a cell corresponding to the frequency;
information about a bandwidth part BWP corresponding to the frequency; and
a frequency channel number corresponding to the frequency.

15. The terminal according to claim 14, wherein in a case that the first frequency is a frequency corresponding to a first RAT, the interference information of the first frequency comprises at least one of the following:
first indication information, used to indicate that the first frequency interferes with a second frequency corresponding to the first RAT;
second indication information, used to indicate that the first frequency is interfered with, by a second frequency corresponding to the first RAT;
third indication information, used to indicate that the first frequency is a frequency associated with the inter-modulation interference; and
fourth indication information, used to indicate that the first frequency interferes with a third frequency corresponding to a second RAT, and indicate that the first frequency is a frequency associated with the inter-modulation interference.

16. The terminal according to claim 14, wherein after the sending auxiliary information of the inter-modulation interference to a network-side device, the processor further implements:
controlling at least two of the frequencies associated with the inter-modulation interference for transmission at different occasions.

17. The terminal according to claim 14, wherein before the sending, in a case that inter-modulation interference occurs between frequencies corresponding to different radio access technologies RATs, auxiliary information of the inter-modulation interference to a network-side device, the processor further implements:
receiving second configuration information sent by the network-side device; and
the sending, in a case that inter-modulation interference occurs between frequencies corresponding to different radio access technologies RATs, auxiliary information of the inter-modulation interference to a network-side device comprises:
if the second configuration information is used to configure allowing the terminal to send the auxiliary information of the inter-modulation interference, in a case that the inter-modulation interference occurs between the frequencies corresponding to the different radio access technologies RATs, sending the auxiliary information of the inter-modulation interference to the network-side device.

* * * * *